(12) United States Patent
Chris

(10) Patent No.: US 6,746,088 B2
(45) Date of Patent: Jun. 8, 2004

(54) MASTER CYLINDER FOR AN ELECTRO-HYDRAULIC BRAKING SYSTEM COMPRISING IMPROVED MEANS OF SIMULATING THE PEDAL FEEL AND AN ELECTRO-HYDRAULIC BRAKING SYSTEM COMPRISING SUCH A MASTER CYLINDER

(75) Inventor: Anderson Chris, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/373,468

(22) Filed: Feb. 24, 2003

(65) Prior Publication Data
US 2003/0160504 A1 Aug. 28, 2003

(30) Foreign Application Priority Data
Feb. 25, 2002 (FR) .............................. 02 02440

(51) Int. Cl.[7] .............................. B60T 8/66; B60T 8/60; B60T 8/44; B60T 7/04; B60T 13/68
(52) U.S. Cl. .................. 303/114.1; 188/358
(58) Field of Search .................. 303/114.1, 113.4, 303/155, 114.2, 122.11, 113.1, 20, 50; 188/156, 158, 72.1, 72.8, 358, 359; 60/566, 545, 582, 591

(56) References Cited

U.S. PATENT DOCUMENTS

| | | | |
|---|---|---|---|
| 6,192,685 B1 * | 2/2001 | Bourlon et al. ............... | 60/566 |
| 6,290,310 B1 * | 9/2001 | Kusano ................. | 303/122.11 |
| 2003/0098611 A1 * | 5/2003 | Drott et al. ............... | 303/114.1 |
| 2003/0160504 A1 * | 8/2003 | Chris ...................... | 303/114.1 |
| 2003/0205932 A1 * | 11/2003 | Anderson ................ | 303/114.1 |

FOREIGN PATENT DOCUMENTS

| | | | |
|---|---|---|---|
| EP | 001338488 A1 * | 8/2003 | |
| EP | 001338489 A1 * | 8/2003 | |
| WO | WO 01/68427 A1 * | 9/2001 | |

* cited by examiner

*Primary Examiner*—Douglas C. Butler
(74) *Attorney, Agent, or Firm*—Leo H. McCormick, Jr.; Warren Comstock

(57) ABSTRACT

A master cylinder for electro-hydraulic braking systems having a body of longitudinal axis pierced with a bore to receive a piston mounted to slide therein in a sealed fashion while axially dividing the bore into a supply chamber sealedly connected to a brake fluid reservoir and a working chamber. The piston is operated by an actuating rod connected to a brake pedal and connected to a cartridge to simulate a reaction of a braking circuit to the pedal. The working chamber in normal operation is in communication with the inside of the cartridge and in degraded operation in communication with at least one brake located at a wheel. The cartridge includes a piston that is subjected via of a first face to the pressurized brake fluid supplied by the working chamber and is subjected via of a second face to a variable-stiffness elastic of a elastic member. The elastic member comprises at least one helical spring and a spacer that is arranged between at least two turns of the spring. The spacer allows turns to press against the spacer when the pressure of the brake fluid in the working chamber exceeds a predetermined value.

10 Claims, 5 Drawing Sheets

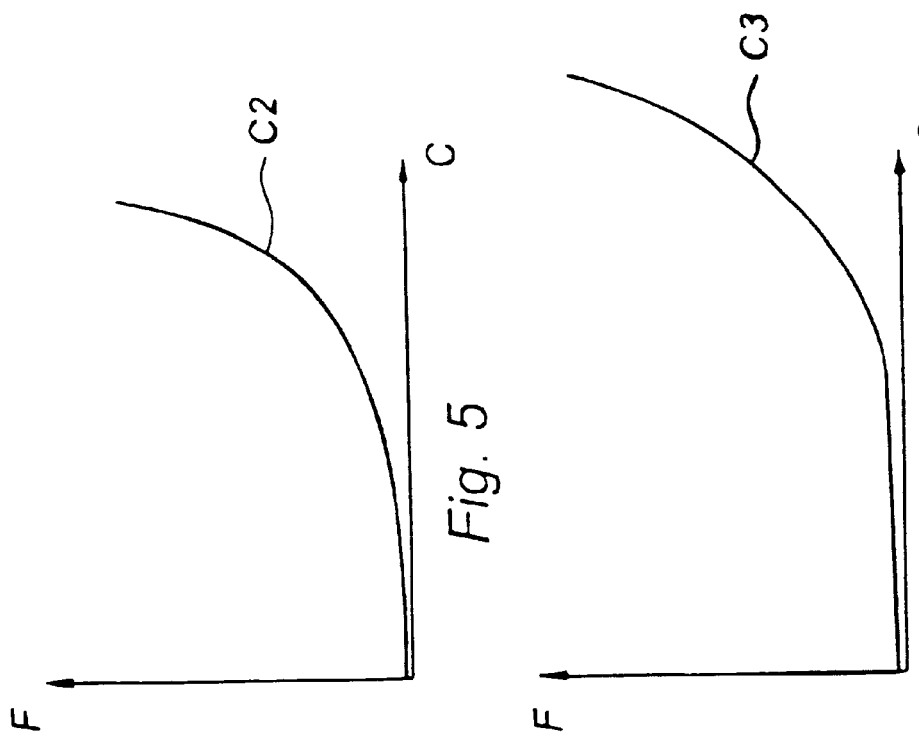
Fig. 5
Fig. 6
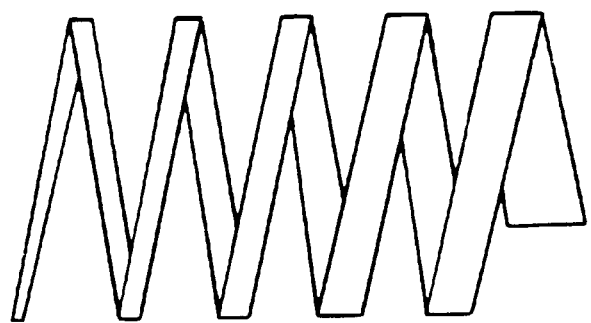
Fig. 3'

MASTER CYLINDER FOR AN ELECTRO-HYDRAULIC BRAKING SYSTEM COMPRISING IMPROVED MEANS OF SIMULATING THE PEDAL FEEL AND AN ELECTRO-HYDRAULIC BRAKING SYSTEM COMPRISING SUCH A MASTER CYLINDER

BACKGROUND OF THE INVENTION

The present invention relates mainly to a master cylinder for an electro-hydraulic braking system comprising improved means of simulating the pedal feel and to an electro-hydraulic braking system comprising such a master cylinder.

Electro-hydraulic braking systems comprise a master cylinder which, in normal operation, simulates the mechanical reaction of a conventional braking circuit felt at the brake pedal by a driver, and means for detecting the action of the driver on the brake pedal sending the information to a computer which generates the command to a hydraulic pump to send pressurized brake fluid to the brakes. In degraded operation, for example when the pump does not respond, the master cylinder supplies pressurized brake fluid to the brakes like in a conventional braking circuit.

Master cylinders for electro-hydraulic braking systems of known type comprise a body of substantially cylindrical shape in which there is made a bore divided into at least one feed chamber and one working chamber by a piston mounted to slide in a sealed manner in the bore and actuated by an actuating rod connected to a brake pedal. The piston at rest allows communication between the two chambers and sealedly separates the two chambers during a braking action. The supply chamber is connected in a sealed manner to a brake fluid reservoir and the working chamber in normal operation is connected to a cartridge simulating the pedal feel or pedal feel cartridge and in degraded operation is connected to at least one brake arranged at a wheel.

The pedal feel cartridge comprises an envelope delimiting a substantially cylindrical chamber in which there slides a piston subjected, in normal operation, during a braking phase, via a first face, to the pressurized brake fluid supplied by the working chamber and via a second face to a first end of an elastic means, the second end of the elastic means bearing against the closed end of the chamber opposite the piston. The elastic means makes it possible to simulate the mechanical reaction of a conventional braking circuit, which corresponds to a relationship connecting the force at the pedal as a function of the pedal travel. The characteristic curve of this relationship has at least one first part corresponding to the absorption of the braking circuit at the beginning of the braking phase, then a second part corresponding to a reaction which increases in magnitude as the level of braking increases.

The elastic means of known type used in pedal feel cartridges are therefore very complicated and expensive; for example, they contain several helical springs, with different spring rates, with constant pitch, variable pitch, elastomer elements to simulate the absorption of the circuit. In addition, assembly is lengthy and therefore increases the cost price because of the high number of components needed to correctly simulate a conventional pedal reaction.

Electro-hydraulic braking systems provide excellent control over the braking and the vehicle, although the means simulating the reaction of the braking circuit are relatively complicated and require precise adjustment, making it inconceivable to apply them to a wide range of vehicles.

In addition, motor vehicle manufacturers are wanting to standardize, as far as possible, the components that make up the braking systems. However, each type of motor vehicle has a characteristic pedal feel, which currently entails making significant modifications to the pedal feel simulation means to suit each type of motor vehicle.

It will be particularly advantageous for the driver of the vehicle to be able to modify the pedal feel according to the desired type of driving, something which is currently impossible with the existing means. In particular, when the motor vehicle is driven by several people who all have different braking preferences, it would be possible for the vehicle computer to store the settings of the pedal feel device relating to each person likely to use the motor vehicle, and to carry out automatic setting-up once the driver has been identified.

It is conceivable to reduce the number of parts of which the simulation cartridge is formed, for example using just one spring.

The use of springs of the helical type with uniform pitch is unsuitable because these springs have a constant spring rate k, and the deformation force Fd is connected as a linear relationship to the axial deformation x by the relationship $Fd=k*x$, this relationship being valid as long as the spring deformation is elastic.

There are also variable-pitch springs the deformation force of which is a non-linear function of the axial deformation of the spring and the characteristic of which is more similar to that of a conventional braking circuit, although these springs do not allow adjustment of the simulated pedal feel to suit the type of vehicle and/or the driver.

SUMMARY OF THE INVENTION

Thus, one object of the present invention is to offer a master cylinder for an electro-hydraulic braking system that is of simple design and allows a simulated pedal feel very similar to the reaction of a conventional braking circuit.

Another object of the present invention is to offer a master cylinder for an electro-hydraulic braking system, that can easily be applied to various models of motor vehicle.

Another object of the present invention is to offer a master cylinder for an electro-hydraulic braking system, the simulated pedal feel of which can be adjusted in a simple way.

Another object of the present invention is to offer a master cylinder for an alectro-hydraulic braking system, that can be used for several models of motor vehicle.

These objects are achieved by a master cylinder comprising a cartridge simulating the pedal feel comprising an elastic means reproducing the reaction of a conventional braking circuit, the elastic means comprising a helical spring and a spacer means arranged between at least two consecutive turns of the helical spring bearing two axially opposed bearing surfaces for the two turns and altering the stiffness of the elastic means when the turns come to rest against the spacer means.

In other words, the elastic means comprises a spring with several turns, coupled to a spacer piece inserted between several turns of the spring, thus forming pairs of turns of the spring which are separated by a spacing turn; as the load on the spring increases, the turns of the spring come gradually and continuously into contact with the spacing parts arranged between each pair of turns, causing a gradual and continuous increase in the stiffness of the elastic means and therefore a reaction at the brake pedal similar to the reaction of a conventional braking circuit.

How this works is that the stiffness of the elastic means determines the reaction of the cartridge simulating pedal feel, the stiffness of the elastic means being inversely proportional to the number of active turns in the helical spring, the turns moving axially in relation to the other turns when load is applied to the spring are termed the active turns.

In consequence, when the elastic means according to the present invention is placed under load, regions of turns of the spring come gradually into contact with the spacer means until the said regions of turns become fixed relative to the turns region following or preceding it in the direction in which the load is applied, the following or preceding turns region being a turns region that is deactivated and acts as a support for deactivating the active turns region.

Advantageously, the spacer piece has a variable cross section along the axis of the spring, and this therefore makes it possible to have a variation in the change in stiffness of the elastic means, offering a reaction very similar to a reaction of a conventional braking circuit.

In addition, the reaction felt at the brake pedal can be altered, by altering the relative position of the spacer means relative to the spring, it is therefore possible to provide a device making it possible, for example, to alter the variation in stiffness of the elastic means, advantageously controlled by a computer of the braking system.

The main subject of the present invention is a master cylinder for electro-hydraulic braking systems comprising a body of longitudinal axis pierced with a bore, a piston mounted to slide in sealed fashion in the bore and axially dividing the bore into a supply chamber sealedly connected to a brake fluid reservoir and a working chamber, the piston being operated by an actuating rod connected to a brake pedal, and a cartridge simulating the reaction of a braking circuit at the pedal, the working chamber in normal operation being in communication with the inside of the cartridge simulating the pedal feel and in degraded operation being in communication with at least one brake arranged at a wheel, the cartridge comprising a piston able to be subjected, via a first face to the pressurized brake fluid supplied by the working chamber and subjected via a second face to a variable-stiffness elastic means, characterized in that the elastic means comprises at least one helical spring and a spacer means arranged between at least two turns of the spring and allowing the said turns to press against the spacer means when the pressure of the brake fluid in the working chamber exceeds a predetermined value.

Another subject of the present invention is a master cylinder, characterized in that the spacer means is formed of a helix forming turns.

Another subject of the present invention is a master cylinder, characterized in that the helix of the cartridge has a cross section of which the dimension along the longitudinal axis continuously increases or decreases by helix portions.

Another subject of the present invention is a master cylinder, characterized in that the spacer means is made of plastic.

Another subject of the present invention is a master cylinder, characterized in that the helical spring has a uniform pitch.

Another subject of the present invention is a master cylinder, characterized in that the spacer means comprises a second longitudinal end mounted fixedly with respect to the piston of the cartridge.

Another subject of the present invention is a master cylinder, characterized in that the cartridge comprises means of adjusting the simulated pedal feel by altering the axial position of the spacer means relative to the spring.

Another subject of the present invention is a master cylinder, characterized in that the adjusting means comprise a stepping electric motor allowing the spacer means to be moved longitudinally and rotationally.

Another subject of the present invention is an electro-hydraulic braking system comprising means of detecting the braking action of the driver, a computer receiving the information from the detection means and generating commands to actuate at least one brake arranged at a wheel, a pressure generator receiving the command from the computer to send pressurized fluid to the brakes, a master cylinder allowing the pedal feel to be simulated under normal operation and serving as a source of pressurized brake fluid in degraded operation, and electrically operated valves to interrupt the communication between the said master cylinder and the brakes in normal operation, characterized in that the said master cylinder is a master cylinder according to the invention.

Another subject of the present invention is a braking system, characterized in that the pressure generator is an electric pump.

The present invention will be better understood with the aid of the description which follows and of the appended drawings for which the front, the rear, the upper part and the lower part correspond respectively to the left, the right, the top and the bottom of the drawings.

BRIEF DESCRIPTION OF THE DRAWINGS

FIG. 3' is a perspective view of an element of FIG. 3;

FIGS. 4, 5, 6 are characteristic curves of the pedal feel obtained with the master cylinder according to the present invention, for various settings.

DETAILED DESCRIPTION OF THE INVENTION

The same references will be used for elements which have substantially the same shape or substantially the same function.

Figure 1:
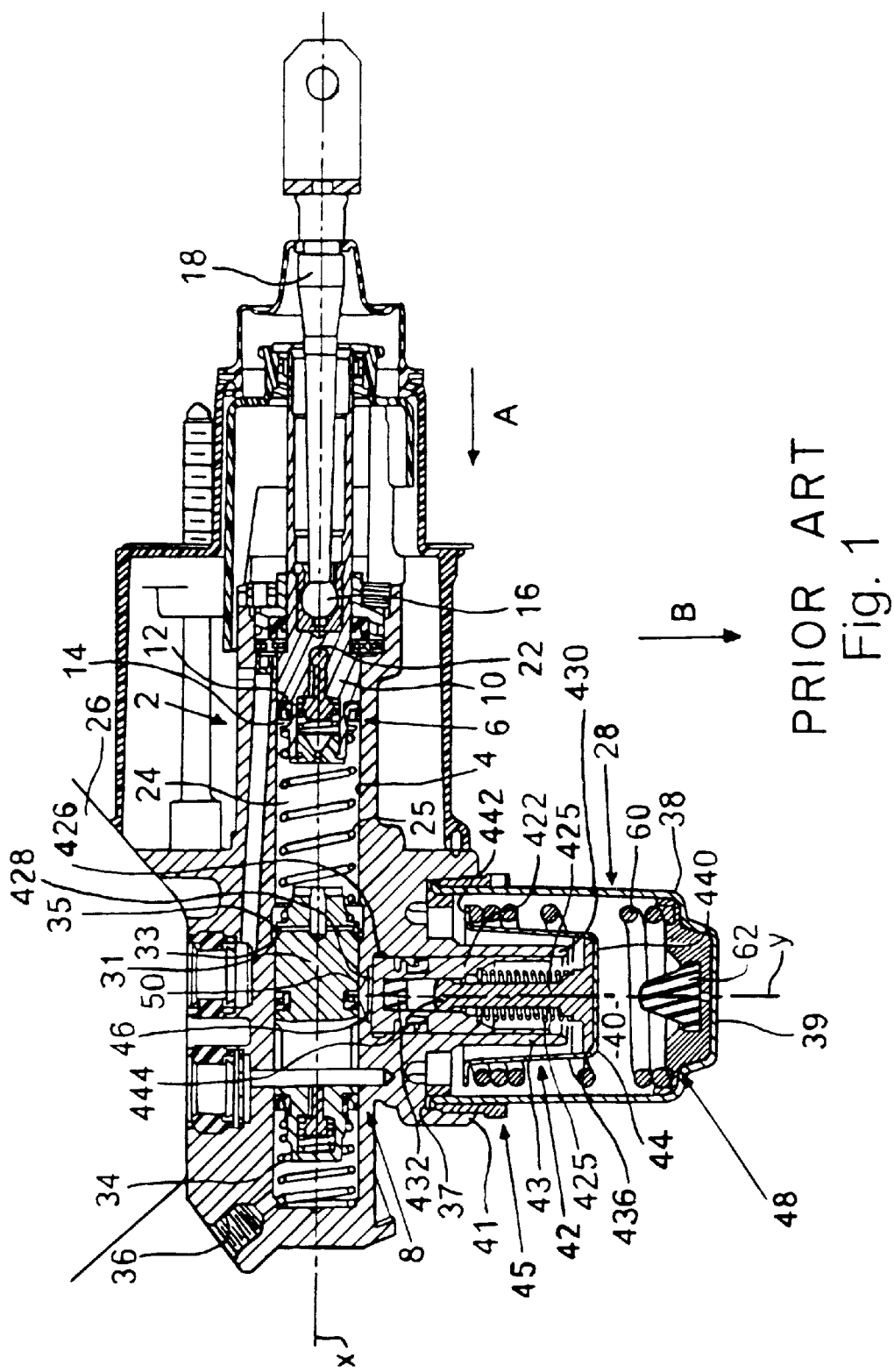
FIG. 1 is a view in longitudinal section of a master cylinder for an electro-hydraulic braking system of the state of the art.

FIG. 1 shows a master cylinder of known type comprising a body 2 of longitudinal axis X pierced with a bore 4 of axis X which is blind, divided into a primary hydraulic circuit 6 and a secondary hydraulic circuit 8. As the primary and secondary hydraulic circuits have similar structures, we shall describe only the primary circuit 6.

The primary circuit 6 comprises a hydraulic piston 10 mounted to slide in a sealed manner in the bore 4 by means of a lip seal 12 mounted in an annular groove 14 made on the periphery of the piston 10. In its rear part, the piston 10 houses a front longitudinal end 16 of an actuating rod 18 shaped as a ball, the actuating rod being connected by a longitudinal rear end 20 to a brake pedal (not depicted) placed in the cabin of the vehicle. The piston 10 divides the bore 4 into a supply chamber 22 arranged behind the piston 10 and a working chamber 24 in front of the piston 10. The supply chamber is connected by sealed means 24 to a brake fluid reservoir 26 and the working chamber is connected in normal operation to a cartridge simulating the pedal feel 28 and in degraded operation is connected to brakes at the wheels.

The piston 10 in its central part has a longitudinal passage 30 equipped with a valve 32 which, at rest, places the supply chamber and the working chamber in communication, and during a braking phase isolates the two chambers 22, 24.

A means 25 of returning the piston 10 is arranged in the primary working chamber 24.

Unlike the primary circuit 6, the secondary circuit is never connected hydraulically to the cartridge 28. Indeed in normal operation, the secondary working chamber 34 is isolated from the braking circuit and, in degraded operation, the secondary working chamber is connected to the brakes by a duct 36 which is open in the rest state and in the degraded state and connects the secondary working chamber 34 to the brakes.

The secondary piston 31 comprises an O-ring seal 35 on its outer periphery, collaborating in degraded operation with a shoulder 33 made on the periphery of the bore 4 and interrupting communication between the working chamber 24 and the inside of the cartridge 28.

The cartridge simulating the pedal feel 28 of axis Y substantially perpendicular to the axis X of the body of the master cylinder comprises a substantially U-shaped envelope 38. The envelope has an open end 37 fixed in sealed manner to the body of the master cylinder and an end wall 39, and defines an interior chamber 40 in which there is sealedly and slideably mounted a piston 42 subjected, on a first face 44, to the pressure in the primary working chamber 24 and on a second face 46, the opposite of the first face 44, to the reaction of an elastic means 48.

Brake fluid from the working chamber 24 is conveyed to the cartridge via a duct 50 made in the body of the master cylinder substantially at right angles to the axis X.

The body of the master cylinder 2 comprises a first 43 and a second 41 sleeve which are coaxial of axis Y, the first sleeve 43 borders the duct 50 and houses such that it can slide in a sealed manner, part of the piston 42, the second sleeve 41 surrounds the first sleeve 43 and comprises means 45 for fixing the cartridge to the body of the master cylinder, for example a screw and nut 45.

The piston 42 is composite and comprises a first tubular part 422 sliding in sealed fashion in the first sleeve 43 by means of a lip seal arranged in a groove 424 made in the exterior periphery of the first part 422. The first tubular part 422 has a first longitudinal end 426 closed off by an end wall 428 facing the duct 50 and a second longitudinal end 430 opposite the first end 426, accommodating a second part 425 of the piston 42 in the shape of a T facing downwards, the base of the T 432 being slideably mounted in the first tubular part 422. A helical spring 434 is mounted in compression between the head 436 of the T 425 and a shoulder made in the first tubular part 422.

The piston 42 also has a third part 438 in the shape of a U facing upwards in the figure and surrounding the first sleeve 43, the bottom 440 of the U 438 housing the head 436 of the second part 425. The third part at its open upper end has a flange 442 extending radially outwards.

An elastic block 444, for example made of elastomer, is arranged between the closed end 428 of the first part 422 and the base of the T 432.

The elastic means 48 for simulating the pedal feel comprises the first helical spring 434 of constant pitch, a helical spring 60 of variable pitch mounted in compression between the closed end 39 of the envelope and the flange 442 and an elastomer peg 62 trapped between the bottom 39 of the cartridge and a lower longitudinal end 64 of the spring 60, the said peg simulating the feel of the reaction at the pedal during maximum braking at the end of travel for a conventional braking circuit.

During the braking action, the springs 434,60 work in their elastic deformation domain.

We shall now quickly describe the operation of the master cylinder of the prior art.

Figure 2:
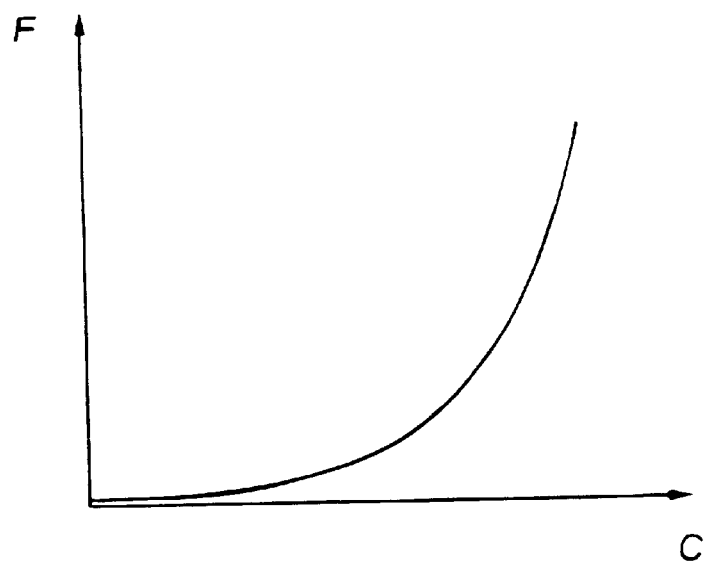
FIG. 2 is a characteristic curve, of the pedal feel of a conventional hydraulic circuit.

When the brake pedal is acted upon, the piston 10 moves in the direction indicated by the arrow A against the action of the spring 25 causing the valve 32 to close and isolating the chambers 22 and 24, the volume of the working chamber 24 reducing, the pressure increases in the working chamber acting on the first face 44 of the piston 42. When the pressure in the working chamber 24 exceeds a predetermined value, the piston 42 moves in the direction of the arrow B against the action of the spring 434 then of the spring 60. First of all, the spring 434 is able to simulate the absorption of a conventional braking circuit, then because of the variability of the pitch of the spring 60, the relationship between the movement of the piston 42 and the pressure applied to the first face 44 of the piston 42 is not linear and is similar to the reaction of a conventional braking circuit (FIG. 2).

At the end of travel, corresponding to a maximum braking force, the piston crushes the peg 62 via the small base 54 and this simulates the saturation in a conventional braking circuit.

The piston of the secondary circuit does not move.

In degraded operation, the duct 36 of the secondary circuit is open and the movement of the primary piston 10 causes the secondary piston 31 to move and this closes the communication between the working chamber 24 and the cartridge 28 by applying the O-ring seal 35 against the shoulder 33. The master cylinder then behaves like a conventional master cylinder.

The master cylinder as described previously is satisfactory although it is complex in design and does not allow the reaction simulated by the cartridge to be altered.

There are also electro-hydraulic braking systems with a single-circuit master cylinder, that is to say one having just one pressure piston and therefore one working chamber connected in normal operation to the pedal feel cartridge and in the event of failure feeding two or four brakes of the wheels.

Figure 3:
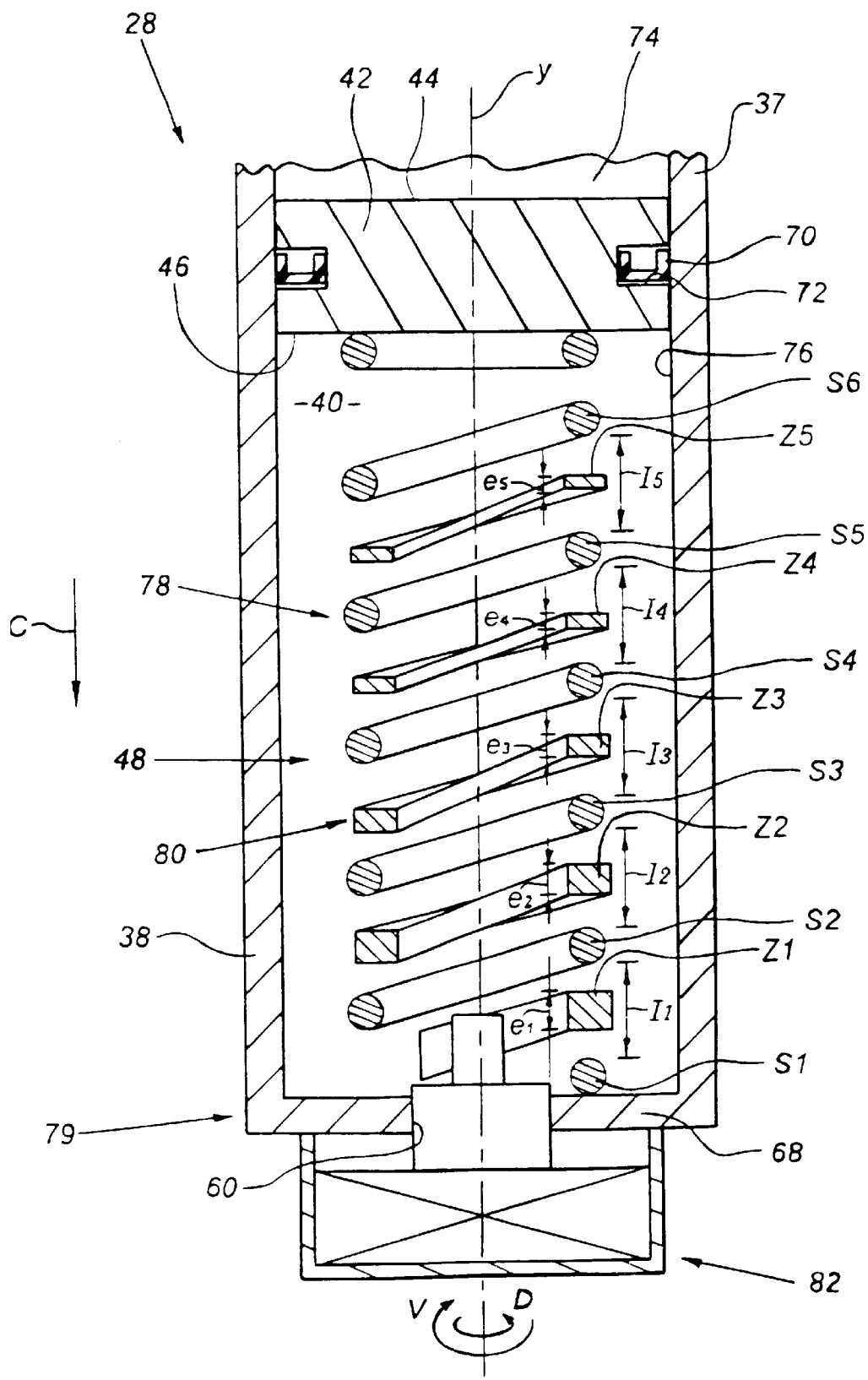
FIG. 3 is a schematic sectioned view of a detail of a master cylinder according to the present invention.

FIG. 3 shows a cartridge for simulating the pedal feel 32 according to the present invention. The master cylinder is identical to the one described previously, and we shall therefore describe only the cartridge 32.

The cartridge 32 according to the present invention has an envelope 38 of axis Y in substantially the shape of a U, the upper part of the U forming an open first longitudinal end 37 of the cartridge which is connected in a sealed manner to the body 2 of the master cylinder. A second longitudinal end opposite the first end 37 forming the end wall 39 of the cartridge is advantageously pierced with an orifice 66 flanked by a substantially annular flange 68 and allowing the passage of an adjusting means.

The envelope 38 defines an interior chamber 40 in which a piston 42 is mounted so that it can slide in a sealed manner, sealing being achieved for example by means of a lip seal 70 mounted fixedly in an annular groove 72 made on the periphery of the piston 42 facing the interior lateral surface of the chamber 40, the shape of she piston 42 not of course being limiting, and the use of a piston as depicted in FIG. 1 not departing from the scope of the present invention.

The piston 42 divides the chamber 40 in a sealed manner into an upper hydraulic chamber 74 delimited in part by a first face 44 of the piston 42 and into a dry lower chamber 76 delimited by a second face 46 of the piston 42, the chamber 76 being qualified as dry because, unlike the chamber 74, it does not receive any brake fluid.

The envelope 38 also comprises an elastic means 48 mounted in the lower chamber 76, the elastic means comprising at least one helical spring 78 of axis Y mounted in compression between the second face 46 of the piston 42 and an end wall 79 of the envelope, advantageously formed of an annular surface 68 bounding an orifice.

The spring 78, according to the embodiment depicted, is a helical spring of uniform pitch, which means that the spring 78 has first turns Sn spaced by a spacing of constant size, in the example depicted, it has the turns S1, S2, S3, S4, S5, S6 spaced apart by spaces I1, I2, I3, I4, I5 respectively, of constant length d.

However, it is conceivable to provide a helical spring of variable pitch, a cylindrical or conical helical spring, the turns of which have a circular or rectangular cross section.

The spring 78, during a braking action, works in its elastic deformation domain.

The elastic means 48 also comprises a spacer means 80 (FIG. 3') of axis Y advantageously of helical shape comprising second turns Zn, in the example depicted it has Z1, Z2, Z3, Z4, Z5. The spacer means 80 is able to collaborate with the spring 78 so that the second turns Z1, Z2, Z3, Z4, Z5 are arranged respectively in the spaces I1, I2, I3, I4, I5.

The turns Zn of the spacer means 80 are of large enough transverse size to allow the turns Sn of the helical spring 78 to rest on them.

If the spring 78 is conical, it is advantageous for the spacer means 80 to have substantially the same cone angle as the spring 78.

The spacer means 80 has a free upper end (not depicted) and a lower end 83 fixed either to a plug closing off the orifice 60 once the spacer means has been fitted, or to means 82 of adjusting the simulated pedal feel.

Obviously the spring 78 may have any number of turns Sn and the spacer means may have a different number of turns to the number of spaces In.

In the embodiment depicted, the helix that forms the spacer means 80 has turns of an axial dimension e along the axis Y which decrease constantly in the direction of the arrow C. The section of turns referenced Z1, Z2, Z3, Z4, Z5 visible in FIG. 3 are respectively of axial size e1, e2, e3, e4, e5, e2 being smaller than e1, e3 being smaller than e2, e4 being smaller than e3 and e5 being smaller than e4.

Of course, the spacer means may be arranged in the envelope 38 and between the turns of the spring 78 in the opposite direction so that the helix forming the spacer means 80 has an axial dimension e in the direction of the axis Y that increases constantly in the direction of the arrow C.

Of course also, a spacer means 80 formed by a helix of axial dimension along the axis Y that varies in a non-monotonous way would not be departing from the scope of the present invention.

The helix advantageously has a rectangular cross section although a helix having, for example, a circular or elliptical cross section would not be departing from the scope of the present invention.

Of course it is also not necessary for all the spaces In to have turns Zn of the spacer means 80.

n is a positive integer greater than or equal to unity.

The spacer means 80 is advantageously made of plastic which has little elastic deformation in the working domain of the elastic means 48, although the use, for example, of metallic materials or of any other material allowing the turns Zn of the spacer piece to move closer together while forming a rigid spacer between the turns Sn of the spring 78 would not be departing from the scope of the present invention.

The embodiment as depicted also comprises the means 82 for adjusting the simulated pedal feel allowing in particular the first part of the force-travel characteristic to be modified by altering the indexing of the turns Z1, Z2, Z3, Z4, Z5 in the spaces I1, I2, I3, I4, I5, by altering the axial position of the spacer means 80 relative to the spring 78, particularly the location of the turns Z1, Z2, Z3, Z4, Z5 in the spaces I1, I2, I3, I4, I5, this altering the thickness of the spacer part positioned between the turns of the spring 78.

Thus, the adjusting means 82 allow the turn Zn in the space In to be moved towards the space In+1 or In−1 depending on the desired modification to the pedal feel, for example the turn Z5 can be moved from the space I5 towards the space I4 and so on.

The adjusting means 82 comprise, for example, a stepping electric motor allowing the spacer means 80 to be screwed in the direction of the arrow V or unscrewed in the direction of the arrow D with respect to the spring 78, the turns Z1, Z2, Z3, Z4, Z5 forming the screw thread and the gaps I1, I2, I3, I4, I5 forming the tapping.

We shall now describe the way in which the pedal feel simulation cartridge according to the present invention works and for that we are going to consider the movement of the turns S1, S2, S3, S4, S5, S6 under a load applied to the elastic means, particularly to the helical spring. When we speak of the turns Sn and the turns Zn coming into contact, this of course means that the turns regions Sn come progressively and continuously into contact with the turns regions Zn.

When the brake pedal is acted upon, the piston 10 moves in the direction of arrow A against the spring 25 causing the valve 32 to close and isolating the chambers 22 and 24, as the volume of the working chamber 24 reduces, the pressure increases in the working chamber and also acts on the first face 44 of the piston 42. When the pressure in the working chamber 24 exceeds a predetermined value, the piston 42 moves in the direction of the arrow B against the action of the spring 78.

Figure 4:
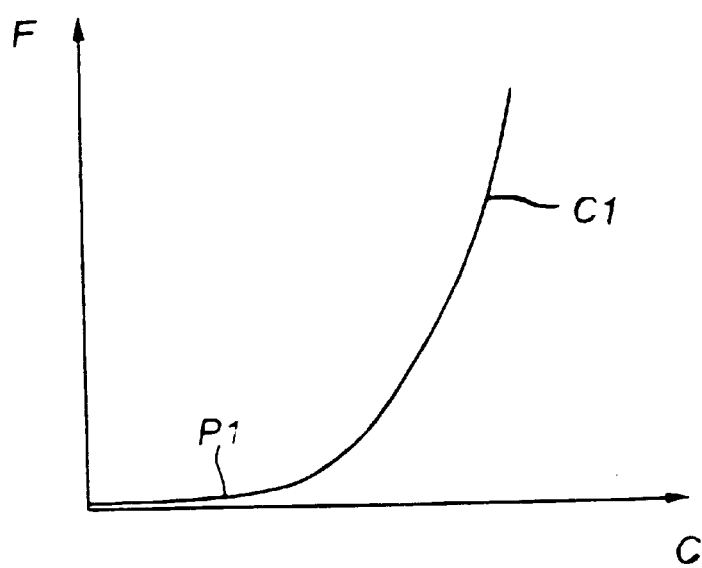

FIG. 4 shows a first example of a characteristic C1 force at the pedal as a function of the travel at the pedal, which is substantially equivalent to the reaction on the piston 42 as a function of the movement thereof.

The characteristic C1 comprises a first part P1 corresponding to the start of movement of the piston 42, which has the effect of compressing the spring 78, the spaces I1, I2, I3, I4, I5 see their length d decrease simultaneously. The size d of the spaces I1, I2, I3, I4, I5 is greater than the dimension e1, so the turns regions S1 and S2 are therefore not yet in contact with the turns region Z1.

When d is equal to e1, the turns regions S1 and S2 come into contact with the turns region Z1, the turns region S1 can therefore no longer move any closer to the turns region S1, and the turns region S2 is therefore said to be inactive, which causes an increase in the stiffness of the elastic means 48 and an increase in the gradient of the characteristic C1.

The spring 78 continues to deform elastically causing the turns S2 and S3 to press progressively and continuously against the turn Z1 of the spacer means 80, the turn S3 therefore becomes inactive, causing a further increase in the stiffness of the elastic means and therefore in the gradient of the characteristic C1.

The variation in gradient occurs continuously, and this corresponds to a pedal feel very similar to the feel felt with a conventional braking circuit.

If the driver continues to increase the force with which he acts upon the brake pedal, the piston 42 continues to compress the spring 78, causing further contacts between the turns of the spring 78 and the turns of the spacer piece and successive increases in the gradient of the characteristic.

When all the turns of the spring 78 separated by a spacer piece 80 are in contact with the turns of the spacer means 80, the characteristic C1 will have a gradient of constant stiffness until the turns of the spring which are not separated by a turn of the spacer means and which are therefore still capable of moving closer together for an increasing applied force simultaneously come into contact, at which point the spring will no longer be able to compress elastically, and this no longer corresponds to normal operation of the master cylinder.

In consequence, the elastic means 48 corresponds to a spring of adjustable variable pitch.

An elastic means comprising a spring of variable pitch and a spacer means equipped with turns of constant or non-constant axial dimension would not be departing from the scope of the present invention.

FIGS. 4, 5 and 6 show characteristics C1, C2 and C3 for an increasing maximum axial dimension of the turns Zn of the spacer means which are placed between the turns Sn of the spring 78, this variation being obtained by means of the adjustment device by unscrewing the spacer means 80 with respect to the spring 78 or angularly moving the spacer piece in the direction of arrow E. This causes a lengthening of the start-up-braking region corresponding to the absorption of a conventional circuit.

Of course, the axis Y of the cartridge can be oriented in any other way than at right angles to the axis X of the body of the master cylinder.

Figure 7:
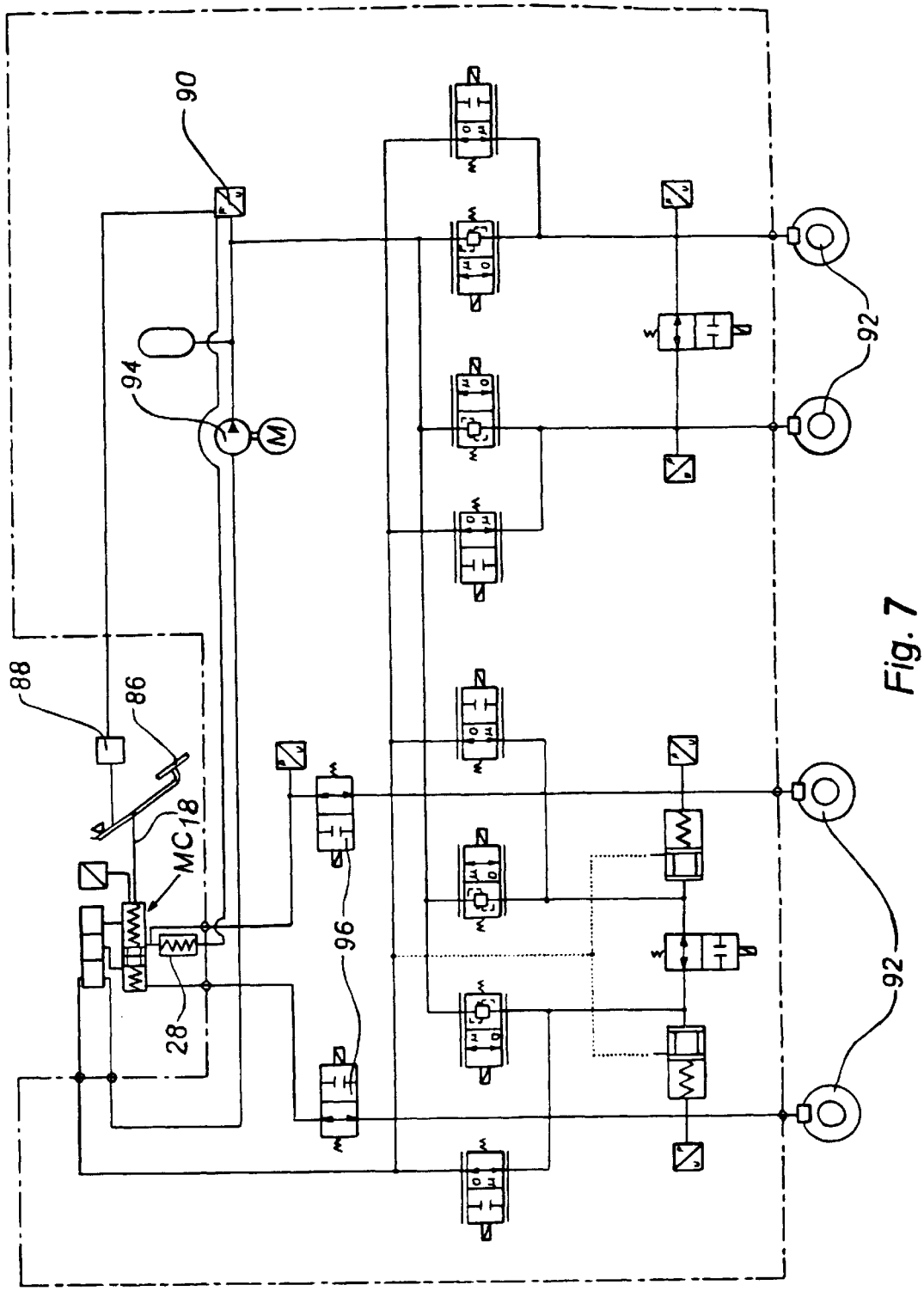
FIG. 7 is a diagram of an electro-hydraulic braking system according to the present invention.

FIG. 7 shows an electro-hydraulic braking system according to the present invention, comprising a master cylinder MC according to the present invention actuated by the actuating rod 18 connected to a brake pedal 86, means 88 of detecting the longitudinal movement of the actuating rod 18, for example travel sensors, a computer 90 receiving information from the detection means 88 and generating commands to actuate the brakes 92, a pressure generator 94, for example an electric pump receiving the command from the computer 90 to send pressurized fluid to the brakes 92 and electrically operated valves 96 to interrupt the communication between the master cylinder and the brakes in normal operation, these valves being open at rest and in degraded operation.

When the driver acts upon the brake pedal 86, the detection means 88 send the information to the computer 90 which generates the command for the pump 94 to send pressurized fluid to the brakes 92. A simulated reaction corresponding to a conventional braking circuit is transmitted to the driver via the brake pedal, giving him the possibility of adjusting the strength of his braking.

Of course, a master cylinder having just one hydraulic circuit formed of one supply chamber and one pressure chamber, the pressure chamber being connected to a pedal feel simulation cartridge having an elastic means according to the present invention would not be departing from the scope of the present invention.

We have indeed produced a master cylinder comprising pedal feel simulating means which are effective and of simple design, and which advantageously allow these master cylinders to be adapted simply and quickly to suit various vehicle models, the technique and/or adapted to suit the desires of the driver of the vehicle.

The present invention applies in particular to the motor industry.

The present invention applies in particular to the motor vehicle braking industry, particularly the braking industry aimed at private cars.

I claim:

1. A master cylinder for electro-hydraulic braking systems comprising a body (2) of longitudinal axis (X) pierced with a bore (4), a piston (10) mounted to slide in sealed fashion in the bore and axially dividing the bore into a supply chamber (22) sealedly connected to a brake fluid reservoir (R) and a working chamber, said piston being operated by an actuating rod connected to a brake pedal, and a cartridge (28) simulating the reaction of a braking circuit at the pedal, said working chamber (24) in normal operation being in communication with the inside of the cartridge (28) simulating the pedal feel and in degraded operation being in communication with at least one brake arranged at a wheel, said cartridge (28) comprising a piston (42) that is subjected, via a first face (44) to pressurized brake fluid supplied by the working chamber (24) and subjected via a second face (46) to a variable-stiffness elastic means (48), characterized in that the elastic means (48) comprises at least one helical spring (78) and a spacer means (80) arranged between at least two turns (Sn) of said spring (79) and allowing said turns to press against said spacer means (80) when the pressure of the brake fluid in the working chamber (24) exceeds a predetermined value.

2. The master cylinder according to claim 1, characterized in that the spacer means (80) is formed of a helix forming turns (Zn).

3. The master cylinder according to claim 2, characterized in that the helix has a cross section of which the dimension along the longitudinal axis continuously increases or decreases by helix portions.

4. The master cylinder according to claim 1 characterized in that the spacer means (80) is made of plastic.

5. The master cylinder according to claim 1 characterized in that the helical spring (78) has a uniform pitch.

6. The master cylinder according to claim 1, characterized in that the spacer means comprises a second longitudinal end (83) mounted fixedly with respect to the piston (42) of the cartridge (28).

7. The master cylinder according to claim 1, characterized in that the cartridge (28) comprises means of adjusting the simulated pedal feel by altering the axial position of the spacer means (80) relative to the spring (78).

8. The master cylinder according to claim 7, characterized in that said adjusting means comprise a stepping electric motor allowing the spacer means (80) to be moved longitudinally and rotationally.

9. The master cylinder according to claim 1 further comprising means (88) for detecting the braking action of a driver, a computer (90) receiving information from the detecting means (88) and generating commands to actuate said brake (92) arranged at a wheel, a pressure generator (94) receiving the command from the computer (90) to send pressurized fluid to said brake (92), the master cylinder allowing the pedal feel to be simulated under normal operation and serving as a source of pressurized brake fluid in degraded operation, and electrically operated valves (96) to interrupt communication between said master cylinder and the brakes in normal operation.

10. The master according to claim 9, characterized in that the pressure generator (94) is an electric pump.

* * * * *